(12) United States Patent
Cretella et al.

(10) Patent No.: US 11,133,659 B2
(45) Date of Patent: Sep. 28, 2021

(54) RECESSED FLOOR FITTING AND COVERS THEREFORE

(71) Applicant: Hubbell Incorporated, Shelton, CT (US)

(72) Inventors: Joseph Nicholas Cretella, Ansonia, CT (US); Emircan Matthew Dumani, Shelton, CT (US)

(73) Assignee: Hubbell Incorporated, Shelton, CT (US)

( * ) Notice: Subject to any disclaimer, the term of this patent is extended or adjusted under 35 U.S.C. 154(b) by 14 days.

(21) Appl. No.: 16/597,445

(22) Filed: Oct. 9, 2019

(65) Prior Publication Data

US 2020/0112156 A1 Apr. 9, 2020

Related U.S. Application Data

(60) Provisional application No. 62/743,292, filed on Oct. 9, 2018.

(51) Int. Cl.
*H02G 3/00* (2006.01)
*H02G 3/38* (2006.01)
*H02G 3/08* (2006.01)
*H02G 3/14* (2006.01)
*H02G 3/12* (2006.01)

(52) U.S. Cl.
CPC ............ *H02G 3/383* (2013.01); *H02G 3/081* (2013.01); *H02G 3/086* (2013.01); *H02G 3/14* (2013.01); *H02G 3/12* (2013.01)

(58) Field of Classification Search
CPC ........ H02G 3/383; H02G 3/081; H02G 3/086; H02G 3/14; H02G 3/12
See application file for complete search history.

(56) References Cited

U.S. PATENT DOCUMENTS

| 5,160,808 | A | * | 11/1992 | Hadfield | H02G 3/185 174/480 |
| 6,843,669 | B2 | * | 1/2005 | Drane | H01R 13/506 174/480 |
| 7,078,616 | B2 | * | 7/2006 | Roesch | H02G 3/185 174/482 |
| 7,795,544 | B2 | * | 9/2010 | Peck | H02G 3/185 174/482 |
| 9,673,598 | B2 | * | 6/2017 | DeBartolo, Jr. | H02G 3/185 |

(Continued)

OTHER PUBLICATIONS

PCT/US2019/055393 International Search Report and Written Opinion dated Dec. 27, 2019.

*Primary Examiner* — Pete T Lee
(74) *Attorney, Agent, or Firm* — Michael Best & Friedrich LLP (57) ABSTRACT

A recessed floor box system is provided herein. The recessed floor box system includes a housing having a set of walls defining an interior chamber; a riser; a non-use cover; and an in-use cover. The riser is connected to the housing and includes an interior opening connected to the interior chamber. The non-use cover is positioned on the riser and across the interior opening. The in-use cover is positioned on the riser and at least partially defines an egress opening that provides access to the interior opening. The in-use cover includes an upper portion having a substantially planar surface and a lower portion having a latch mechanism to secure the cover over the riser.

16 Claims, 6 Drawing Sheets

(56) References Cited

U.S. PATENT DOCUMENTS

| | | |
|---|---|---|
| 10,439,378 B2 * | 10/2019 | Richards .................. H02G 3/14 |
| 2004/0113432 A1 | 6/2004 | Hall |
| 2006/0060368 A1 | 3/2006 | Dinh |
| 2009/0218128 A1 | 9/2009 | Carbone et al. |
| 2010/0072198 A1 | 3/2010 | Roemer et al. |
| 2010/0024464 A1 | 9/2010 | Rajagopal et al. |
| 2014/0000956 A1 | 1/2014 | Wurms et al. |
| 2014/0144667 A1 | 5/2014 | DeBartolo, Jr. et al. |
| 2015/0236486 A1 | 8/2015 | Dinh |
| 2017/0256930 A1 | 9/2017 | Wurms |

\* cited by examiner

RECESSED FLOOR FITTING AND COVERS THEREFORE

FIELD

Various exemplary embodiments relate to recessed floor fittings to house any combination of electrical, data, communication, audio, and visual connections.

SUMMARY

Different housings have been developed to house electrical, data, communication, audio, and visual connections recessed in a floor or a sub-floor. One example is a housing that extends into a concrete floor and includes a flange substantially flush with the floor level. A lid is connected to the housing to provide selective access by a user. Different combinations of electric, phone, data, and audio visual outlets are positioned in the housing so that a user can connect devices as needed. Openings can be provided in the lid so that cables can extend through the lid when in the closed position.

The invention provides, in one aspect, a recessed floor box may include: a housing having a set of walls defining an interior chamber; a riser connected to the housing, the riser having an interior opening, the interior opening connecting to the interior chamber; and a cover configured to be positioned on the riser and across at least a portion of the interior opening, the cover including an upper portion having a substantially planar surface and a lower portion having a latch mechanism to secure the cover to the riser.

The invention provides, in yet another aspect and combinable with any other aspect, a recessed floor box where the cover may include a straight edge at least partially defining an egress opening, the egress opening providing access to the interior chamber when the cover is positioned across at least a portion of the interior opening.

The invention provides, in yet another aspect and combinable with any other aspect, a recessed floor box where the latch mechanism may include a wedge latch biased radially away from the cover.

The invention provides, in yet another aspect and combinable with any other aspect, a recessed floor box, where the cover may have a zero-profile with substantially no visible surface features when positioned across the at least a portion of the interior opening and on the riser.

The invention provides, in yet another aspect and combinable with any other aspect, a recessed floor box that may include a flange configured to be positioned between the riser and the cover, and where the flange may be connected to the riser and is configured to receive the cover.

The invention provides, in yet another aspect and combinable with any other aspect, a recessed floor box where the flange may include a recessed channel, the recessed channel configured to engage at least a first latch of the latch mechanism.

The invention provides, in yet another aspect and combinable with any other aspect, a recessed floor box where the latch mechanism may include a second latch, and where the recessed channel may be configured to engage the first latch and the second latch of the latch mechanism.

The invention provides, in yet another aspect and combinable with any other aspect, a recessed floor box where the first latch and the second latch of the latch mechanism may each be biased radially away from the latch mechanism by a respective biasing member.

The invention provides, in yet another aspect and combinable with any other aspect, a recessed floor box where a gasket may be positioned around a circumference of the cover.

The invention provides, in yet another aspect and combinable with any other aspect, a recessed floor box that may include an adapter positioned between the flange and the riser, the adapter including at least two projections configured to attach the adapter to the riser.

The invention provides, in yet another aspect, a recessed floor box system that may include: a housing having a set of walls defining an interior chamber; a riser connected to the housing, the riser having an interior opening connected to the interior chamber; a non-use cover configured to be positioned on the riser and across the interior opening, the non-use cover including an upper portion having a substantially planar surface and a lower portion having a latch mechanism to secure the cover on the riser; and an in-use cover configured to be positioned on the riser, the in-use cover at least partially defining an egress opening that provides access to the interior opening, the in-use cover including an upper portion having a substantially planar surface and a lower portion having a latch mechanism to secure the cover over the riser.

The invention provides, in yet another aspect and combinable with any other aspect, a recessed floor box where the in-use cover may include a straight edge, the straight edge at least partially defining the egress opening.

The invention provides, in yet another aspect and combinable with any other aspect, a recessed floor box where the latch mechanism of either the non-use cover or the in-user cover may include a wedge latch biased radially away from the latch mechanism.

The invention provides, in yet another aspect and combinable with any other aspect, a recessed floor box where each of the non-use cover and the in-use cover may have a zero-profile with no visible surface features when positioned across the at least a portion of the interior opening and on the riser.

The invention provides, in yet another aspect and combinable with any other aspect, a recessed floor box that may include a flange configured to be positioned on the riser and to receive the non-use cover or the in-use cover.

The invention provides, in yet another aspect and combinable with any other aspect, a recessed floor box where the flange may include a recessed channel, the recessed channel configured to engage at least a first latch of the latch mechanism.

The invention provides, in yet another aspect and combinable with any other aspect, a recessed floor box where the latch mechanism may include a second latch, and where the recessed channel may be configured to engage the first latch and the second latch of the latch mechanism.

The invention provides, in yet another aspect and combinable with any other aspect, a recessed floor box where the first latch and the second latch of the latch mechanism may each be biased radially away from the latch mechanism by a respective biasing member.

The invention provides, in yet another aspect and combinable with any other aspect, a recessed floor box where an adapter may be positioned between the flange and the riser, the adapter including at least two projections configured to attach the adapter to the riser.

The invention provides, in yet another aspect, a cover for a recessed floor box system. The cover may include: an upper portion having a substantially planar surface and a lower portion having a latch mechanism, the latch mechanism including a first and a second wedge latch, where each of the first and the second wedge latch is biased radially away from the cover; and a straight edge, the straight edge at least partially defining an outer circumference of the cover.

Other features and aspects of the invention will become apparent by consideration of the following detailed description and accompanying drawings.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

Figure 1:
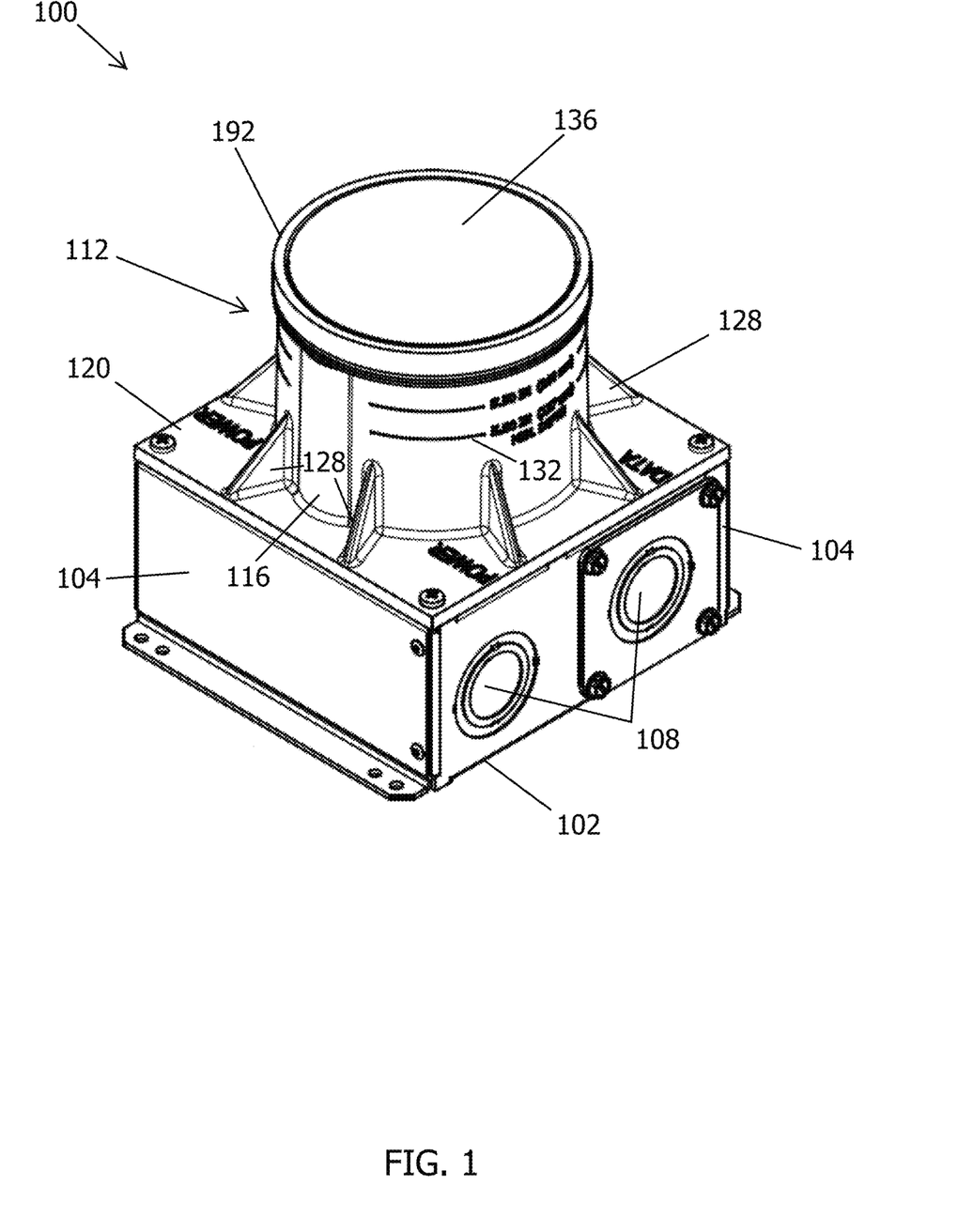
FIG. 1 is a perspective view of a floor box according to some embodiments.
Figure 2:
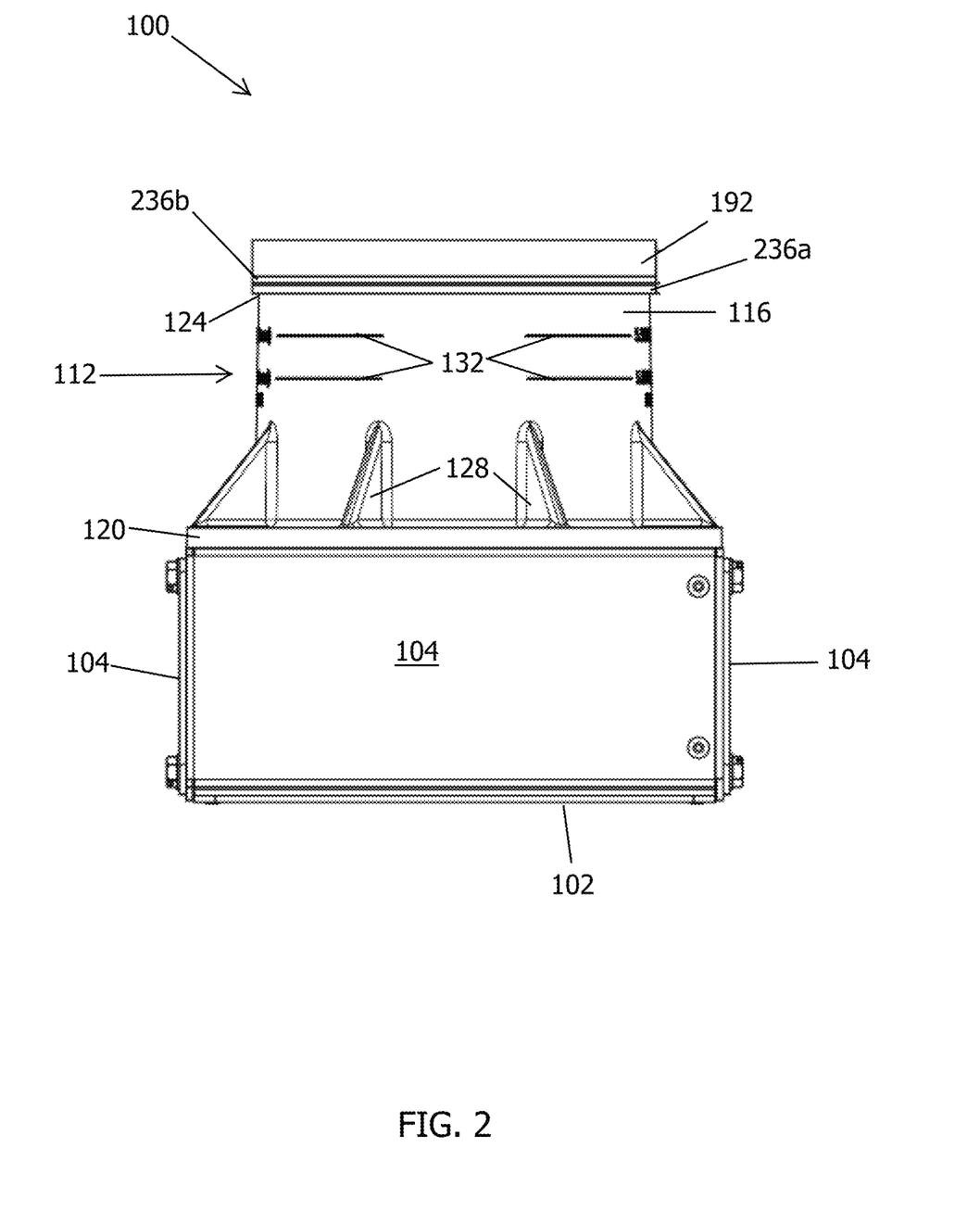
FIG. 2 is a side view of the floor box of FIG. 1 according to some embodiments.

FIGS. 1 and 2 show an exemplary recessed floor box 100 used to house different combinations of electrical, data, communication, audio, and visual connections. The floor box 100 in the embodiment shown has a bottom wall 102 and a plurality of side walls 104 extending upward from the bottom wall 102. In the embodiment shown, the floor box 100 has a substantially square configuration with four side walls. In other embodiments, the electrical box 100 can have more than four sides and can have other configurations such as a rectangular or hexagon shape, or can have less than four sides and can have configurations such as triangular or circular. The floor box 100 is provided with an open top end providing access to an interior cavity of the floor box 100. In the embodiment illustrated, the side walls 104 include knock-outs or pry-outs 108 for accessing the interior of the floor box 100 and feeding electrical wiring into the floor box 100 and to a wiring device supported within the box 100. In other embodiments, the floor box 100 can have hubs to connect to different types of conduits.

In the embodiment shown, the floor box 100 includes a riser 112. The riser 112 has a cylindrical wall 116 extending upwardly from a mounting flange 120. In other embodiments, the wall may have a different shape (e.g., a polyhedron with any number of sides). The cylindrical wall 116 includes an upper edge mounting flange 120 to an upper edge 124. The riser 112 can include a bottom portion (not shown) extending below a bottom face of mounting flange 120 to extend into the cavity of the floor box 100. The bottom portion can include one or more outwardly extending flanges (not shown) for separating the wiring within compartments formed in the floor box 100. Reinforcing ribs 128 extend between the outer surface of the cylindrical wall 116 and a top face of the mounting flange 120 to provide sufficient strength to the upper portion of the riser 112. The outer surface of the riser 112 is provided with indicia 132 for assisting the installer in positioning the top end of the riser 112 with respect to the floor.

Figure 3:
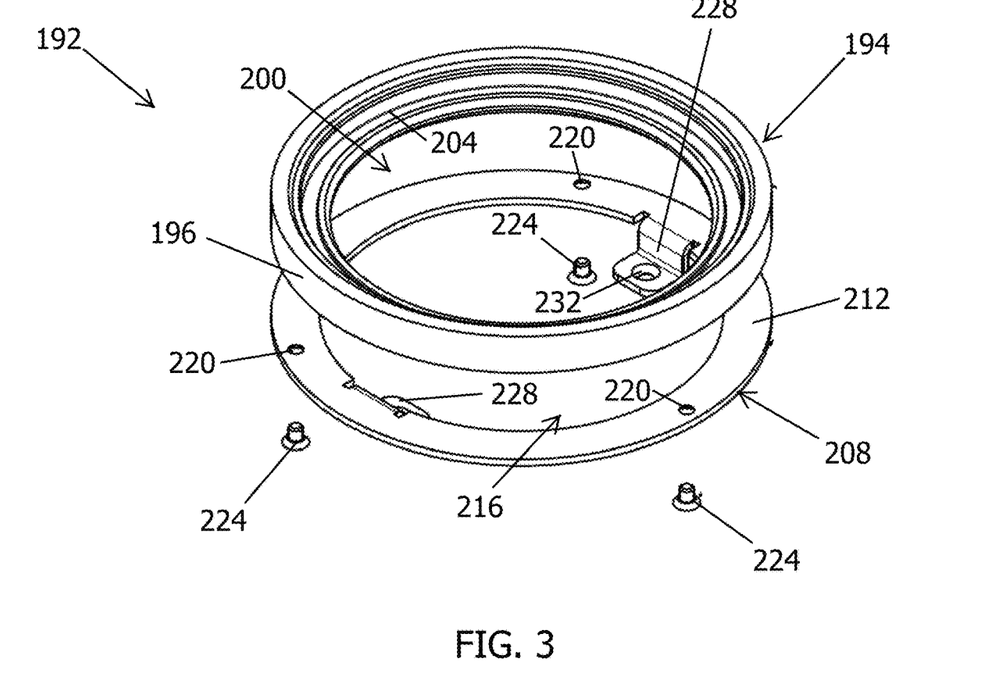
FIG. 3 is an exploded view of a flange to be coupled to the floor box of FIG. 1 according to some embodiments.
Figure 4:
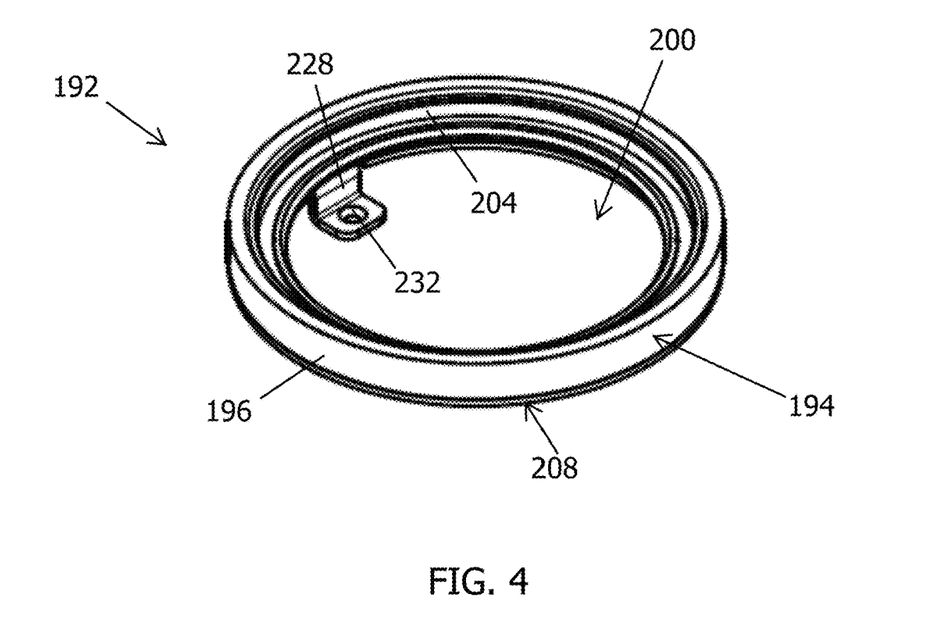
FIG. 4 is a perspective view of the flange of FIG. 3 according to some embodiments.

FIGS. 3 and 4 show an exemplary embodiment of a flange 192 configured to connect to the riser 112. The flange 192 includes a body 194 with a wall 196 that matches the shape of the wall 116 (e.g., cylindrical) and defines a central opening 200. In the illustrated embodiment, a diameter of the central opening is four inches, although in other embodiment the central opening may have a different diameter (e.g., six, eight, or ten inches). The flange 192 includes a recessed channel 204 adjacent to the central opening 200. In the illustrated embodiment, the recessed channel 204 extends around the entire perimeter of the central opening 200, although in other embodiments, the recessed channel 204 may extend around only a portion of the central opening 200.

In the illustrated embodiment, an adapter 208 includes a substantially flat upper surface 212 with an opening 216 approximately the same size as the central opening 200. Apertures 220 extend through the adapter 208 and are configured to receive fastening members (e.g., threaded screws) 224. The fastening members 224 extend through the apertures 220 and engage a surface of the body 194 in order to couple the adapter 208 to the body 194.

In the illustrated embodiment, the adapter 208 includes two projections 228 that extend away from the upper surface 212, although in other embodiments, the adapter 208 may include a fewer or greater number of projections 228. Each projection 228 extends into the opening 216 and includes a fastening aperture 232. When the flange 192 is connected to the floor box 100, the projections 228 are disposed proximate to an internal surface of the cylindrical wall 116. The riser 112 includes openings (not shown) that correspond to each fastening aperture 232. A fastener (not shown) is configured to be received by each fastening aperture 232 and the openings of the riser 116 in order to couple the flange 192 to the floor box 100.

As best shown in FIG. 2, gaskets or spacers 236a, 236b are positioned between the upper edge 124 and the flange 192 prior to coupling the flange 192 to the riser 112. The exemplary embodiment includes a fiber spacer 236a and a rubber spacer 236b, although any number and type of spacers may be used. An adhesive (e.g., RTV silicone) is applied to both sides of each spacer 236a, 236b in order to couple the spacers to each other, as well as to the riser 112 and the flange 192. The spacers 236a, 236b assist in shimming the flange 192 flush with the floor, and also provide scrub-water resistance to the interior of the floor box 100.

Figure 5:
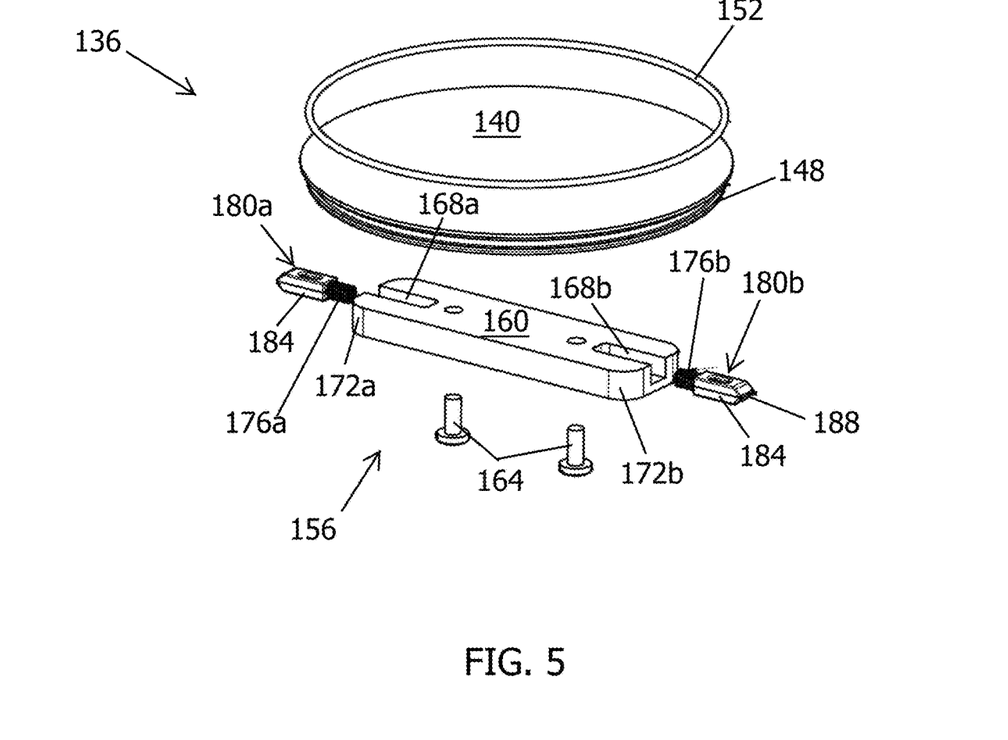
FIG. 5 is an exploded view of a first cover to be used with the floor box of FIG. 1 according to some embodiments.
Figure 6:
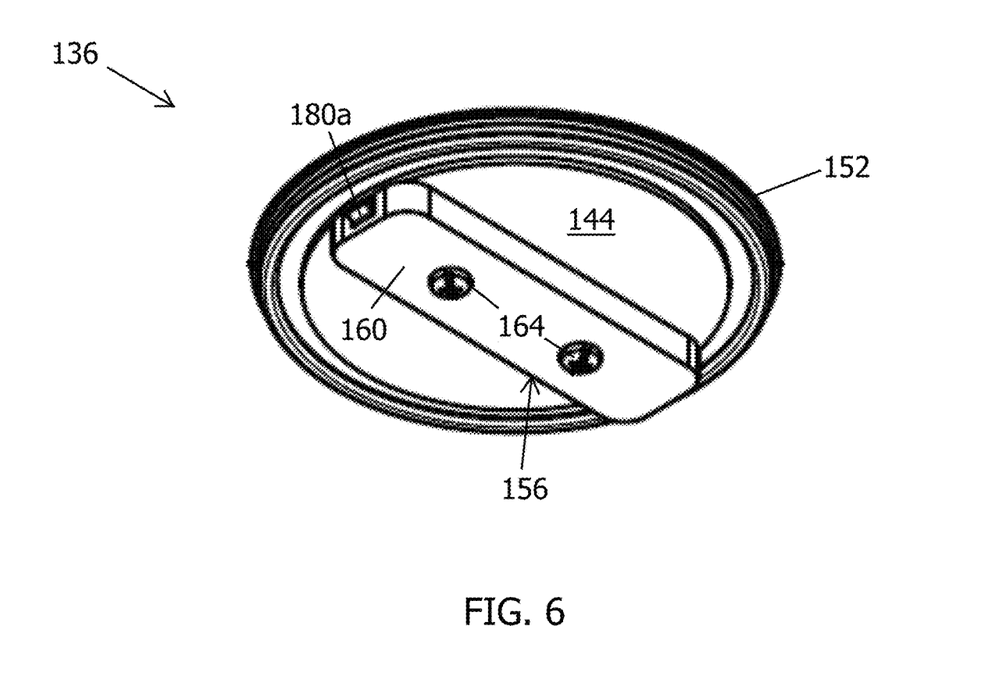
FIG. 6 is a lower perspective view of the first cover of FIG. 5 according to some embodiments.

FIGS. 1, 5, and 6 show an exemplary embodiment of a first cover 136 configured to connect to the flange 192. The first cover 136 is a non-use cover having a round configuration that covers the opening in the riser 112. The first cover 136 has an upper surface 140 facing the exterior and a lower surface 144 facing the interior of the riser 112. In some embodiments, the upper surface 140 is a substantially planar surface that sits substantially flush with an upper edge of the flange 192. In some embodiments, the upper surface 140 has no handle, visible attach or release mechanism, or other visible transitions, resulting in a zero-profile look (i.e., the upper surface 140 is flush with the flooring underneath which the floor box 100 sits).

The outer edge of the first cover 136 can include a recessed channel 148 configured to receive a gasket 152, for example an O-ring. The gasket 152 can be an elastomeric material. When the first cover 136 is connected to the flange 192, the gasket 152 can form a water resistant seal that provides a scrub-water rating for the first cover 136 and the floor box 100.

As best shown in FIG. 5, a latch mechanism 156 for connecting the first cover 136 to the riser is connected to the lower surface 144. The latch mechanism 156 includes a latch housing 160 secured to the lower surface 144 of the first cover 136 by a pair of fasteners 164. The latch housing 160 includes a first slot 168a formed in a first end 172a and a second slot 168b formed in a second end 172b. The first slot 168a receives a first biasing member 176a and a first latch 180a. The second slot 168b receives a second biasing member 176b and a second latch 180b. The biasing members 176a, 176b moveably bias the respective latches 180a, 180b outwardly from the latch housing 160. In some embodiments, the biasing members 176a, 176b are compression springs. Each of the first and second latches 180a, 180b can include a body 184 having a front wedge portion that includes a top angled surface and a bottom angled surface. The top and bottom angled surfaces taper toward one another to form a point 188. The interior of the body 184 can include a chamber for receiving the respective biasing member 176a, 176b. While a pair of latches 180a, 180b is shown, certain embodiments can utilize a single latch or more than two latches.

When the first cover 136 is connected to the flange 192, the latches 180a, 180b are biased into the recessed channel 204 of the cylindrical wall 196 to engage the flange 192 and hold the first cover 136 in place. The latches 180a, 180b may engage the flange 192 along any portion of the recessed channel 204. To remove the first cover 136, a user can insert a tool, such as a flat head screw driver or other thin blade tool to move one of the latches 180a, 180b against the respective biasing member 176a, 176b, and disengage the latch 180a, 180b from the recessed channel 204. The first cover 136 can then be lifted from the riser 112. Positioning the latch mechanism 156 on the lower surface 144 so that it is hidden from view inhibits unauthorized or accidental access by an unqualified person.

Figure 7:
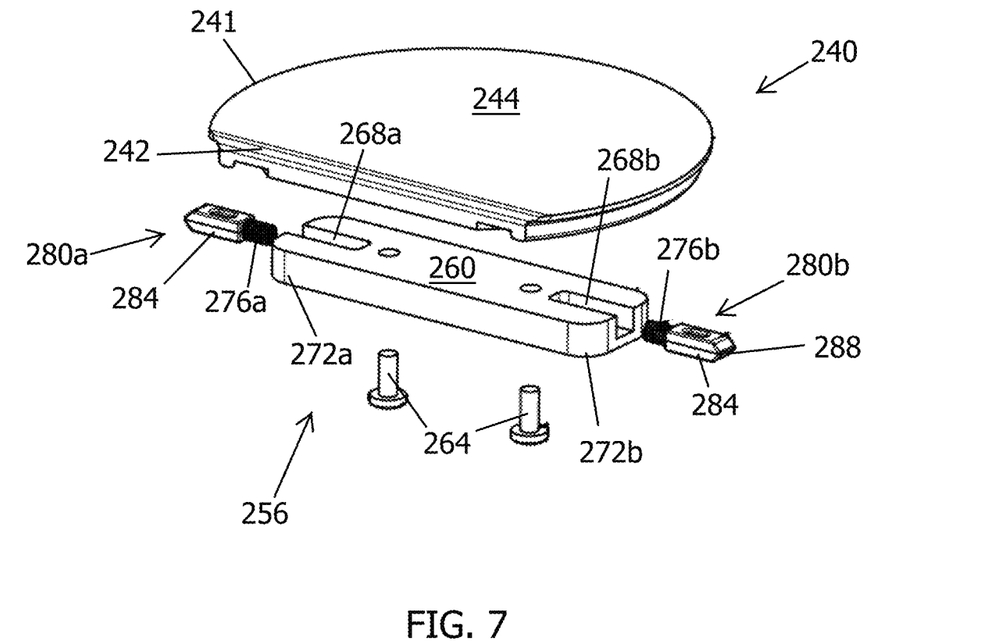
FIG. 7 is an exploded view of a second cover to be used with the floor box of FIG. 1 according to some embodiments.
Figure 8:
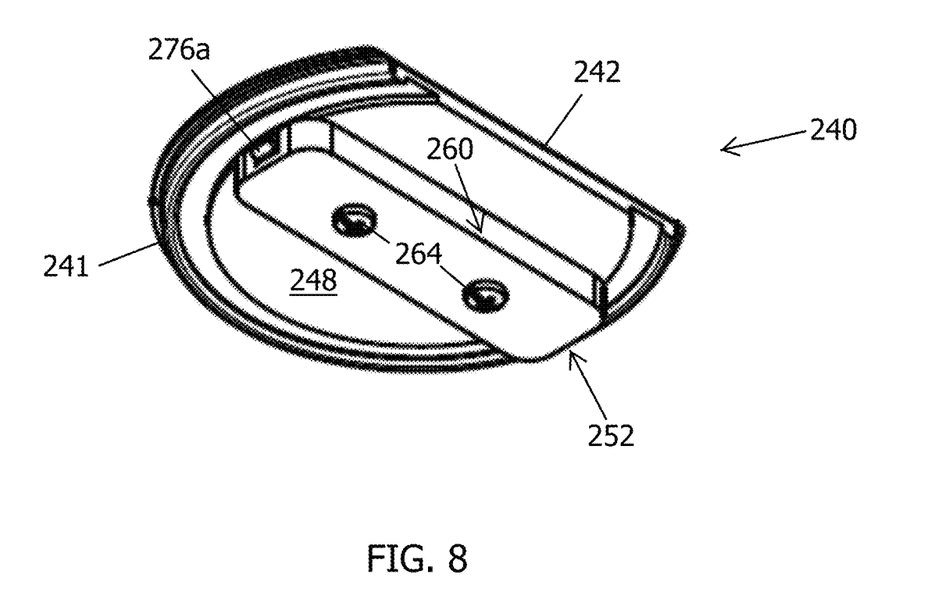
FIG. 8 is a lower perspective view of the second cover of FIG. 5 according to some embodiments.
Figure 9A:
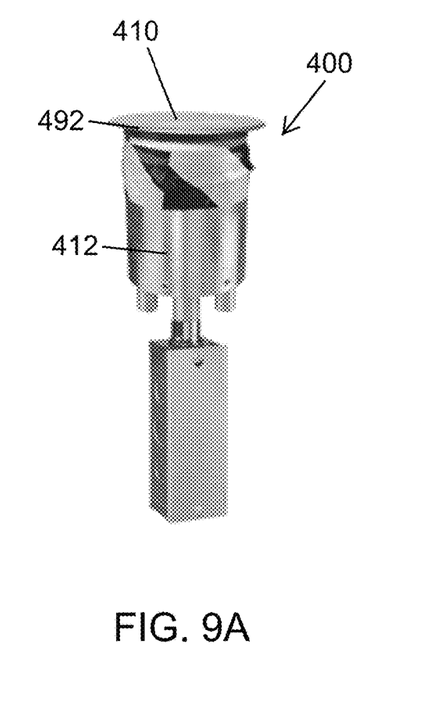
FIG. 9A is a perspective view of a floor box according to another embodiment.
Figure 9B:
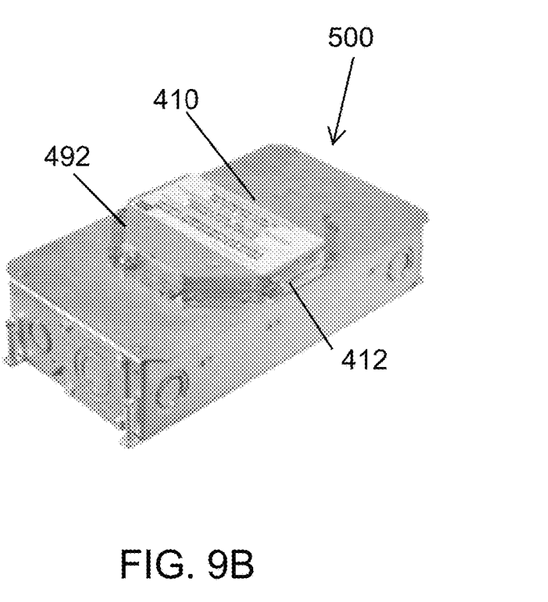
FIG. 9B is a perspective view of a floor box according to another embodiment.
Figure 9C:
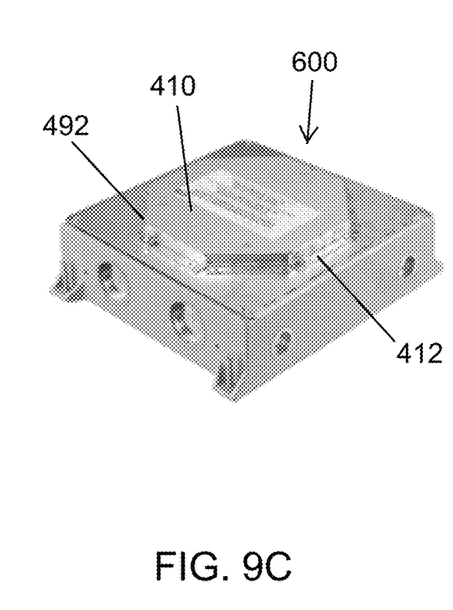
FIG. 9C is a perspective view of a floor box according to another embodiment.
Figure 9D:
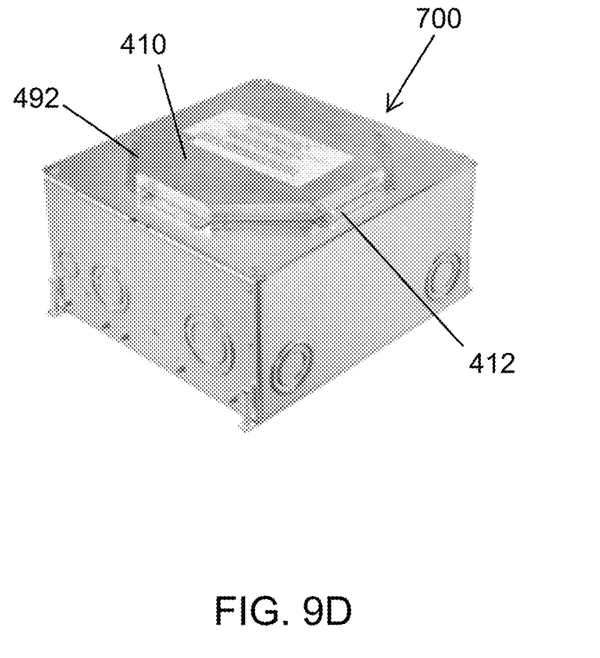
FIG. 9D is a perspective view of a floor box according to another embodiment.

FIGS. 7 and 8 show an exemplary embodiment of a second cover 240 configured to connect to the flange 192. The second cover 240 is an in-use cover having a partially round configuration that covers a portion of the opening in the riser 112. In the illustrated embodiment, the second cover 240 includes a circular edge 241 with a radius substantially the same as a radius of the first cover 136, and a straight edge 242. In other embodiments, all edges of the second cover 240 may be straight. The straight edge can define an egress opening between the second cover 240 and the cylindrical wall 116 of the riser 112. The position of the straight edge 242 will define the size of the egress opening and the arc length of the circular edge 241. In an exemplary embodiment, the position of the straight edge 242 is offset from the center of the second cover 240, so that the arc length of the circular edge 241 is greater than the arc length of the egress opening. In some embodiments, the position of the straight edge 242 is offset from the center of the second cover by at least half the radius of the second cover 240.

The second cover 240 has an upper surface 244 facing the exterior and a lower surface 248 facing the interior of the riser 112. In some embodiments, the upper surface 244 is a substantially planar surface that sits substantially flush with the upper edge of the flange 192. In some embodiments, the upper surface 244 has no handle, visible attach or release mechanism, or other visible transitions, resulting in a zero-profile look.

As best shown in FIG. 7, the second cover 240 includes a latch mechanism 256 that is substantially the same as the latch mechanism 156. Similar elements are identified with the same reference number plus "100".

Removing the first cover 136 provides the user with access to a wiring device supported within the box 100. A user may connect an electrical cord (not shown) with the wiring device in order to provide electrical current to an external electrical device (not shown). The wiring device is configured to be disposed within the cavity of the floor box 100, so that a cord receiving portion (e.g., an electrical outlet—not shown) is fully recessed within the floor box 100.

The second cover 240 connects to the flange 192 in the same manner as the first cover 136. The straight edge 242 and the cylindrical wall 196 along the recessed channel 204 define an egress. Electrical cords are allowed to pass through the egress and connect to the external electrical device, but the plugs of the cords remain completely within the floor box 100. When the external electrical device is no longer in use, the second cover 240 may be removed in a similar manner as the first cover 136 (e.g., with a tool like a flat head screw driver), and the cord may be disconnected from the cord receiving portion. The first cover 136 can then be reconnected to the flange 192 to once again provide the floor box 100 with water resistance.

As shown in FIGS. 9A-9D, other embodiments of recessed boxes may utilize a two cover system. The recessed floor box may be a fire-rated poke-through 300 (FIG. 9A) or a recessed gang floor box (e.g., a 2 gang floor box 400 (FIG. 9B), a 4 gang floor box 500 (FIG. 9C), a 10 gang floor box 600 (FIG. 9D)). These recessed floor boxes 300, 400, 500, 600 each preform a generally similar function as the floor box 100, in that they support a wiring device. Each embodiment of the floor box 300, 400, 500, 600 is fit with a flange 492 that couples to a riser 412 and a first cover 410 and a second cover (not shown). The flange 492 may be differently shaped (e.g., octagonal) than the flange 192, but the operation of coupling and removing the covers 410 remains the same. The first cover 410 and the second cover remain flush with the flange 492 to create a zero-profile appearance.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

The invention claimed is:

1. A recessed floor box comprising:
 a housing having a set of walls defining an interior chamber;
 a riser connected to the housing, the riser having an interior opening, the interior opening connecting to the interior chamber; and
 a cover configured to be positioned on the riser and across at least a portion of the interior opening, the cover including an upper portion extending across the entire interior opening and consisting of a planar surface with a zero-profile having no visible surface features, the cover further including a lower portion having a latch mechanism to secure the cover to the riser.

2. The recessed floor box of claim 1, wherein the latch mechanism includes a wedge latch biased radially away from the cover.

3. The recessed floor box of claim 1, further comprising a flange configured to be positioned between the riser and the cover, and wherein the flange is connected to the riser and is configured to receive the cover.

4. The recessed floor box of claim 3, wherein the flange includes a recessed channel, the recessed channel configured to engage at least a first latch of the latch mechanism.

5. The recessed floor box of claim 4, wherein the latch mechanism includes a second latch, and wherein the recessed channel is configured to engage the first latch and the second latch of the latch mechanism.

6. The recessed floor box of claim 5, wherein the first latch and the second latch of the latch mechanism are each biased radially away from the latch mechanism by a respective biasing member.

7. The recessed floor box of claim 3, wherein a gasket is positioned around a circumference of the cover.

8. The recessed floor box of claim 3, further comprising an adapter positioned between the flange and the riser, the adapter including at least two projections configured to attach the adapter to the riser.

9. A recessed floor box system comprising:
 a housing having a set of walls defining an interior chamber;
 a riser connected to the housing, the riser having an interior opening connected to the interior chamber;
 a non-use cover configured to be positioned on the riser and across the interior opening, the non-use cover including an upper portion extending across the entire interior opening and consisting of a planar surface with a zero-profile having no visible surface features, the non-use cover further including a lower portion having a latch mechanism to secure the cover on the riser; and
 an in-use cover configured to be positioned on the riser, the in-use cover at least partially defining an egress opening that provides access to the interior opening, the in-use cover including an upper portion having a substantially planar surface and a lower portion having a latch mechanism to secure the cover over the riser, and
 wherein the in-use cover includes a straight edge at least partially defining the egress opening, the straight edge extending linearly from a first point along an outer circumference of the cover to a second point along the outer circumference of the cover, the egress opening providing access to the interior chamber when the cover is positioned across at least a portion of the interior opening.

10. The recessed floor box of claim 9, wherein the latch mechanism of either the non-use cover or the in-user cover includes a wedge latch biased radially away from the latch mechanism.

11. The recessed floor box of claim 9, further comprising a flange configured to be positioned on the riser and to receive the non-use cover or the in-use cover.

12. The recessed floor box of claim 11, wherein the flange includes a recessed channel, the recessed channel configured to engage at least a first latch of the latch mechanism.

13. The recessed floor box of claim 12, wherein the latch mechanism includes a second latch, and wherein the recessed channel is configured to engage the first latch and the second latch of the latch mechanism.

14. The recessed floor box of claim 13, wherein the first latch and the second latch of the latch mechanism are each biased radially away from the latch mechanism by a respective biasing member.

15. The recessed floor box of claim 11, wherein an adapter is positioned between the flange and the riser, the adapter including at least two projections configured to attach the adapter to the riser.

16. A cover for a recessed floor box system, the cover comprising:
 an upper portion having a substantially planar surface and a lower portion having a latch mechanism, the latch mechanism including a first and a second wedge latch, wherein each of the first and the second wedge latch is biased radially away from the cover, and
 a straight edge, the straight edge extending linearly from a first point along an outer circumference of the cover to a second point along the outer circumference of the cover.

* * * * *